US009398812B2

(12) United States Patent
Sanae

(10) Patent No.: US 9,398,812 B2
(45) Date of Patent: Jul. 26, 2016

(54) CORE FOR ARMREST

(71) Applicant: TOKAI CHEMICAL INDUSTRIES, LTD., Gifu (JP)

(72) Inventor: Shoji Sanae, Aichi (JP)

(73) Assignee: TOKAI CHEMICAL INDUSTRIES, LTD., Gifu (JP)

( * ) Notice: Subject to any disclaimer, the term of this patent is extended or adjusted under 35 U.S.C. 154(b) by 20 days.

(21) Appl. No.: 14/186,490

(22) Filed: Feb. 21, 2014

(65) Prior Publication Data

US 2014/0167479 A1 Jun. 19, 2014

Related U.S. Application Data

(63) Continuation of application No. PCT/JP2013/069457, filed on Jul. 18, 2013.

(30) Foreign Application Priority Data

Jul. 19, 2012 (JP) ................... 2012-160693

(51) Int. Cl.
*A47C 7/54* (2006.01)
*B60N 2/46* (2006.01)
*B60N 2/68* (2006.01)
*B29C 45/14* (2006.01)
*B29L 31/30* (2006.01)

(52) U.S. Cl.
CPC .............. *A47C 7/54* (2013.01); *B60N 2/4606* (2013.01); *B60N 2/682* (2013.01); *B29C 45/14* (2013.01); *B29L 2031/3026* (2013.01)

(58) Field of Classification Search
CPC ........ A47C 7/543; A47C 7/54; B60N 2/4606; B60N 2/4626; B60N 2/4633; B29L 2031/3026; B29C 45/14
USPC .............. 297/411.2–411.46, 411.32, 411.35, 297/411.38
See application file for complete search history.

(56) References Cited

U.S. PATENT DOCUMENTS 4,205,879 A * 6/1980 Heling .............. 297/411.32
4,848,840 A * 7/1989 Toya ................. 297/411.32
(Continued)

FOREIGN PATENT DOCUMENTS

DE 3300993 7/1984
GB 1497443 1/1978
(Continued)

OTHER PUBLICATIONS

Search report from E.P.O., mail date is Feb. 5, 2015.
(Continued)

*Primary Examiner* — Patrick Maestri
(74) *Attorney, Agent, or Firm* — Greenblum & Bernstein, P.L.C.

(57) ABSTRACT

To provide a core for armrest, the core including a stopper pin for restricting rotation, and exhibiting higher resistance to loads. A core for armrest includes a framed body being made of resin, a stopper pin being made of metal, the stopper pin being subjected to insert molding in the framed body so as to protrude a leading-end side thereof toward an outer side of the framed body, and being hooked onto a stopper of a seat, thereby being restricted from rotating, and a rib being integrally molded onto the framed body inside the framed body, and being disposed so as to overlap with respect to a base-end face of the stopper pin in an axial direction of the stopper pin.

6 Claims, 5 Drawing Sheets

(56) References Cited

U.S. PATENT DOCUMENTS

| | | | | |
|---|---|---|---|---|
| 6,059,366 | A * | 5/2000 | Hu | B60N 2/46 297/411.31 |
| 6,168,236 | B1 * | 1/2001 | Chen | 297/411.2 |
| 6,234,515 | B1 * | 5/2001 | Iwanaga | 280/728.2 |
| 6,328,384 | B1 * | 12/2001 | Yamauchi et al. | 297/411.29 |
| 6,471,297 | B1 * | 10/2002 | Runde et al. | 297/411.32 |
| 6,520,576 | B1 * | 2/2003 | Burns et al. | 297/188.14 |
| 7,296,855 | B1 * | 11/2007 | Link | 297/353 |
| 2004/0093799 | A1 * | 5/2004 | Yoshikawa et al. | 49/192 |
| 2004/0178653 | A1 * | 9/2004 | Kanie | 296/75 |
| 2005/0242648 | A1 * | 11/2005 | Williams et al. | 297/411.2 |
| 2012/0133189 | A1 * | 5/2012 | Kobayashi et al. | 297/411.38 |

FOREIGN PATENT DOCUMENTS

| | | |
|---|---|---|
| JP | 9-24170 | 1/1997 |
| JP | 2000-70070 | 3/2000 |
| JP | 2003-289986 | 10/2003 |

OTHER PUBLICATIONS

International Search Report and Written Opinion Aug. 20, 2013.

* cited by examiner

CORE FOR ARMREST

CROSS-REFERENCE TO RELATED APPLICATION

This is a continuation of Application PCT/JP2013/069457, filed on Jul. 18, 2013, which is incorporated herein by reference. The present invention is based on Japanese Patent Application No. 2012-160693, filed on Jul. 19, 2012, the entire contents of which are incorporated herein by reference.

BACKGROUND OF THE INVENTION

1. Field of the Invention

The present invention is one which relates to a core for armrest that is supported rotatably onto a seat in a cantilevered manner.

2. Description of the Related Art

It is required for an armrest being supported rotatably with respect to a seat to exhibit high strength so as to be capable of supporting large loads even when a child sits on the armrest to apply it the large loads. Consequently, a core of the armrest has been heretofore generally made of metal conventionally. However, as set forth in Japanese Unexamined Patent Publication (KOKAI) Gazette No. 2003-289986 and Japanese Unexamined Patent Publication (KOKAI) Gazette No. 2000-70070, for instance, high-strength resins have been developed recently, so that it has become possible to intend to make an armrest lightweight by using those resins for a core of the armrest. Moreover, subjecting a metallic material to insert molding in an armrest's core being made of resin is set forth in Japanese Unexamined Patent Publication (KOKAI) No. 9-24170, and so on.

Patent Literature No. 1: Japanese Unexamined Patent Publication (KOKAI) Gazette No. 2003-289986;

Patent Literature No. 2: Japanese Unexamined Patent Publication (KOKAI) Gazette No. 2000-70070; and Patent Literature No. 3: Japanese Unexamined Patent Publication (KOKAI) Gazette No. 9-24170

SUMMARY OF THE INVENTION

Incidentally, there have been the following types: a type in which a stopper pin, which is disposed in order to restrict an armrest from rotating when it reaches a predetermined angle while allowing it to rotate, is fixated onto the side of a seat; and another type in which the stopper pin is fixated onto a core of the armrest. In the case of either of the two types, it becomes necessary that the stopper pin can exhibit high resistance to loads. Note herein that, in the latter type in which the armrest's core is equipped with the stopper pin, it is not easy to make resistance to loads higher at portions of the core that are present around the stopper pin when the core is made of resin.

The present invention is one which has been done in view of such circumstances. It is therefore an object of the present invention to provide a core for armrest, core which comprises a stopper pin for restricting rotation, and which exhibits higher resistance to loads.

A core for armrest that is directed to one of the present means is a core being for an armrest that is supported rotatably onto a seat in a cantilevered manner, and comprising:

a framed body being made of resin;

a stopper pin being made of metal, the stopper pin being subjected to insert molding in the framed body so as to protrude a leading-end side thereof toward an outer side of the framed body, and being hooked onto a stopper of the seat, thereby being restricted from rotating; and a rib being integrally molded onto the framed body inside the framed body, and being disposed so as to overlap with respect to a base-end face of the stopper pin in an axial direction of the stopper pin.

It is possible to intend to make the entire core lightweight by means of making the framed body and rib of the core of resin. Moreover, it is possible to secure the strength of pin itself by means of making the stopper pin of metal that is to be subjected to insert molding in the framed body. Therefore, in a state where the stopper pin hooks onto the stopper of the seat, the pin per se exhibits high resistance to loads.

In addition, the rib is disposed so as to overlap with respect to a base-end face in the stopper pin in an axial direction. Consequently, it is possible to inhibit the stopper pin from coming off from the framed body by means of the rib with high strength. Therefore, the stopper pin can be retained integrally onto the framed body and rib that are made of resin, even when high loads act on it.

Hereinafter, explanations will be made as to some of suitable embodiments of the core for armrest that is directed to the present means.

It is preferred that the stopper pin can have a base-end large-sized section on a base-end side thereof, the base-end large-sized section being formed as a cross-sectional configuration that is larger than that of the leading-end side; and, of one of faces of the base-end large-sized section, a face on the leading-end side of the stopper pin can be covered with resin forming the framed body. Thus, even when come-off forces, which are headed toward the leading-end side of the stopper pin, act with respect to the stopper pin, the stopper pin can be retained integrally by means of resin forming the framed body (i.e., resin covering the base-end large-sized section). That is, the stopper pin can be prevented from coming off toward the leading-end side by means of resin covering the base-end large-sized section, and can be prevented from coming off toward the base-end side by means of the rib. Therefore, the stopper pin can be reliably turned into a state where it is retained integrally onto the framed body securely. Note that the clause, which implies that the base-end large-sized section has a cross-sectional configuration that is larger than that of the leading-end side, means that a diameter of a circumscribed circle of the base-end large-sized section is greater than a diameter of a circumscribed circle of the leading-end side; and that the base-end large-sized section, and the leading-end side can have either circular shapes or polygonal shapes.

Moreover, it is preferred that a part of the base-end face in the stopper pin, and at least a part of a leading-end face in the stopper pin can be exposed in order to position the stopper pin at the time of insert molding. It is thus possible to position the stopper pin with respect to the resulting framed body highly accurately by means of exposed faces at the axial opposite ends of the stopper pin. Note herein that the rib is not formed on its exposed section of the base-end face in the stopper pin. That is, the rib is formed on other than that exposed section.

It is preferred that an exposed fraction of the base-end face in the stopper pin can be formed in a range that corresponds to the leading-end face of the stopper pin in an axial direction. Thus, at the time of insert molding, it is possible to press the stopper pin at axially identical positions in the opposite ends of the stopper pin; as a result, it is possible to position the stopper pin highly accurately with respect to the resulting framed body and rib.

It is preferred that a widthwise part of the rib can be disposed so as to overlap with respect to an outer-circumference edge of the base-end face in the stopper pin in an axial direction of the stopper pin. Thus, even a widthwise part of the rib can demonstrate forces that restrain the stopper pin from coming off toward the base-end side. Note that the rib can also be disposed at a part of the outer-circumference edge in the stopper pin, or can even be disposed over the entire periphery of the outer-circumference edge.

It is preferred that the rib can be disposed so as to overlap with respect to a range, of the base-end face in the stopper pin, that corresponds to the leading-end face in an axial direction. By thus disposing the rib in a range that corresponds to the leading-end face of the stopper pin in an axial direction, it is possible to securely demonstrate forces that restrain the stopper pin from coming off toward the base-end side.

DESCRIPTION OF THE PREFERRED EMBODIMENTS

Example 1

Figure 1:
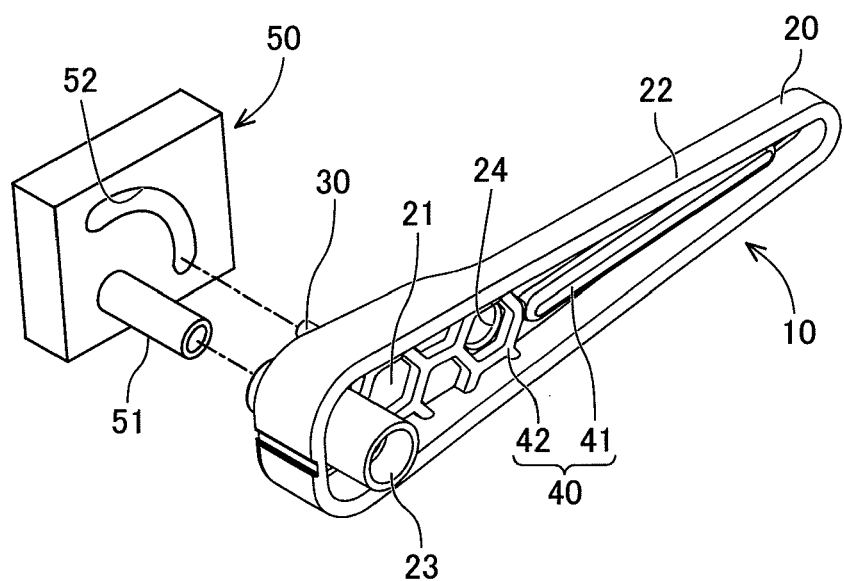
FIG. 1 is a perspective diagram of a core for armrest in First Embodiment Mode according to the present invention, and of a seat-side mating member.
Figure 2:
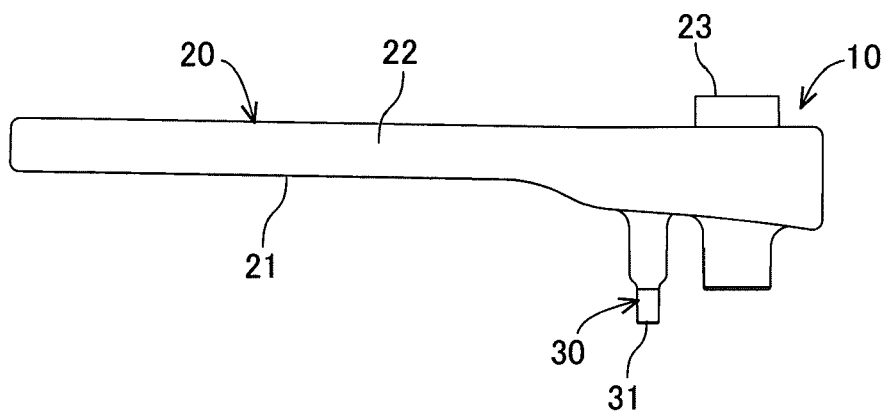
FIG. 2 is a front-view diagram of the core for armrest shown in FIG. 1.

Explanations will be made on a core for armrest according to First Embodiment Mode. An armrest is supported rotatably, for instance, onto the seat back of a seat in an automobile in a cantilevered manner. As illustrated in FIG. 1, this armrest comprises a core 10, a skin (not shown) covering the core 10, and a pad (not shown) having cushioning property, such as polyurethane foam, and being disposed between the core 10 and the skin.

Note herein that, as illustrated in FIG. 1, not only the core 10 of the armrest is supported rotatably with respect to a supporting member 50 to be fixated onto one of the side faces of the seat back in a cantilevered manner but also the rotary angle is restricted within a predetermined range. The present embodiment mode belongs to a type in which a stopper pin 30, which is disposed in order to restrict the armrest from rotating when the rotary angle reaches a set-up angle while allowing the armrest to rotate, is fixated onto the armrest's core 10.

That is, as illustrated in FIG. 1, the supporting member 50 to be fixated onto the seat back comprises a supporting shaft 51 supporting the armrest in a cantilevered manner, and a stopper 52 not only allowing the stopper pin 30 to move in an arc shape but also restricting the stopper pin 30 from rotating at a set-up angle. The supporting shaft 51 can either be hollow or solid. The stopper 52 can have a configuration, which is capable of restricting the stopper pin 30 from rotating at the set-up angle, such as arc-shaped grooves, arc-shaped recesses and protrusions. Meanwhile, the core 10 of the armrest comprises a rotation-supporting cylindrical section 23 into which the supporting shaft 51 of the supporting member 50 is fitted rotatably, and the stopper pin 30 that restricts the rotary angle of the armrest by hooking onto the stopper 52.

Hereinafter, explanations will be made on details of the core 10 of the armrest with reference to FIG. 2 through FIG. 5. The core 10 is made by subjecting the stopper pin 30, which is made of metal, to insert molding in resin. This core 10 comprises a framed body 20, which made of resin, the stopper pin 30, and a rib 40, which made of resin. To the resin for forming the framed body 20 and rib 40, "PA66-GP," "PP-GF," and the like, can be applied, for instance.

The framed body 20 constitutes an outward form of the core 10, and is formed as an elongated-member-like shape. The framed body 20 is formed as a bottomed cylindrical shape (or a container shape) so as to have an opening in one of the opposite faces (e.g., in the right-hand front side in FIG. 1). That is, the framed body 20 is formed as a configuration in which a wall 22 is formed over the entire end periphery of a bottom 21 that is formed as an elongated-plate-like shape. On one of the longitudinal opposite-end sides of the bottom 21 in the framed body 20, the rotation-supporting cylindrical portion 23 is disposed so as to cross the opposite faces in the bottom 21 substantially perpendicularly, and is disposed to protrude from each of the opposite faces in the bottom 21. Into the rotation-supporting section 23, the supporting shaft 51 of the supporting member 50 to be fixated onto the seat back is inserted, as described above. That is, the rotation-supporting cylindrical section 23 makes the rotary center of the armrest. In addition, an injection inlet 24 for injecting materials for polyurethane form between the skin and the core 10 is formed at a longitudinal middle of the bottom 21. Note that, in a case of the armrest being free of comprising the pad, it is not necessary to form the injection inlet 24.

Figure 5:
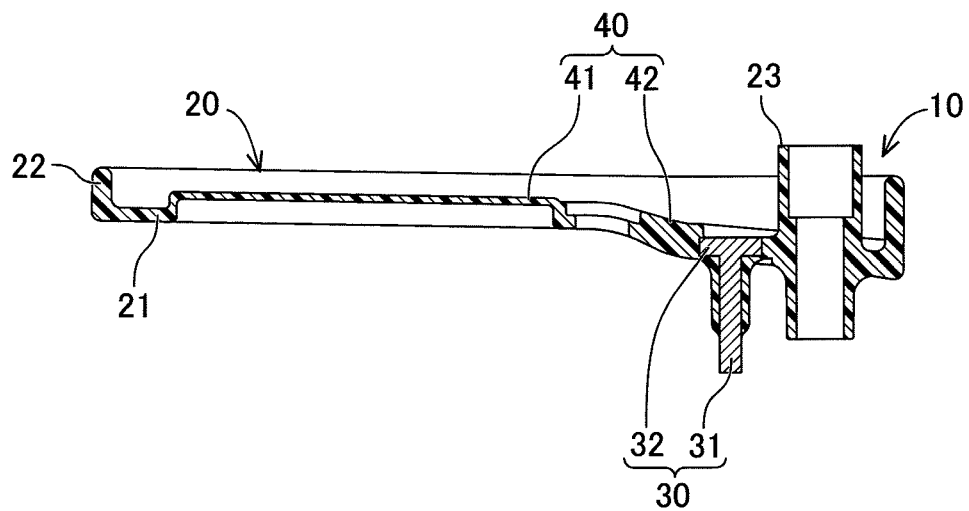
FIG. 5 is the "V"-"V" cross-sectional diagram of the core for armrest shown in FIG. 3.

The stopper pin 30 is made of metal, such as ferrous-based ones, and is subjected to insert molding in the framed body 20. As illustrated in FIG. 5, this stopper pin 30 is formed finer at the leading-end side than at the base-end side. In the present embodiment mode, the stopper pin 30 is formed as a stepped shaft shape. That is, the stopper pin 30 has a leading-end shaft section 31 making the lower-side part in FIG. 5, and a base-end large-sized section 32 having a cross-sectional configuration that is larger than that of the leading-end shaft section 31. However, the stopper pin 30 is not limited at all to the stepped shaft shape, and it can also be formed as a tapered shaped so that the finer it becomes the more it heads toward the leading-end side. Note that the clause, which implies that the base-end large-sized section 32 has a cross-sectional configuration that is larger than that of the leading-end shaft section 31, means that a diameter of a circumscribed circle of the base-end large-sized section 32 is greater than a diameter of a circumscribed circle of the leading-end shaft section 31; and that the base-end large-sized section 32, and the leading-end shaft section 31 can have either circular shapes or polygonal shapes.

Note herein that, although the leading-end shaft section 31 has a cylindrical shape in the present embodiment mode, it can also have, not limited to this, polygonal column shapes or can even have tapered configurations. And, the leading end of the leading-end shaft section 31 hooks onto the stopper 52 of the supporting member 50, thereby restricting the rotary angle. Moreover, although the base-end large-sized section 32 is formed as a disk shape whose diameter is larger than that of the leading-end shaft section 31, it can also be formed as polygons. In addition, in the present embodiment mode, the leading-end shaft section 31, and the base-end large-sized section 32 are made coaxial to each other, the two can even be made eccentric to each other so as to have centers that differ one another.

The stopper pin 30 is disposed next to the rotation-supporting cylindrical section 23 of the framed body 20. In this instance, although the base-end large-sized section 32 of the stopper pin 30 is buried in the bottom 21 of the framed body 20, the leading-end shaft section 31 of the stopper pin 30 protrudes toward the outer side of the framed body 20. Note herein that a part of the leading-end face of the base-end large-sized section 31, and at least a part of the leading-end shaft section 32 are exposed in order to position the stopper pin 30 at the time of insert molding. Manufacturing steps by means of insert molding will be described later. In addition, resin forming the framed body 20 covers a face on the leading-end side in the base-end large-sized section 32 of the stopper pin (i.e., the stepped face being on the opposite side to the base-end face in the present embodiment mode). In the present embodiment mode, the resin forming the framed body 20 covers up to at around the middle of the leading-end shaft section 31 of the stopper pin 30.

Figure 3:
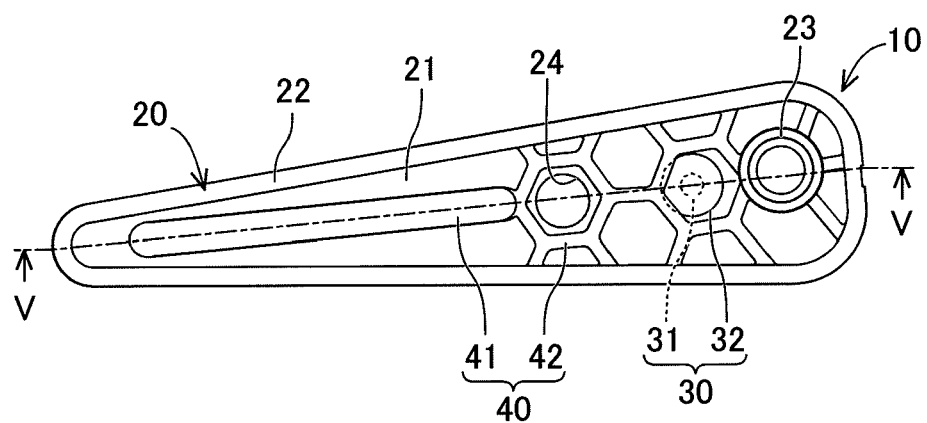
FIG. 3 is a plan-view diagram of the core for armrest shown in FIG. 2.
Figure 4:
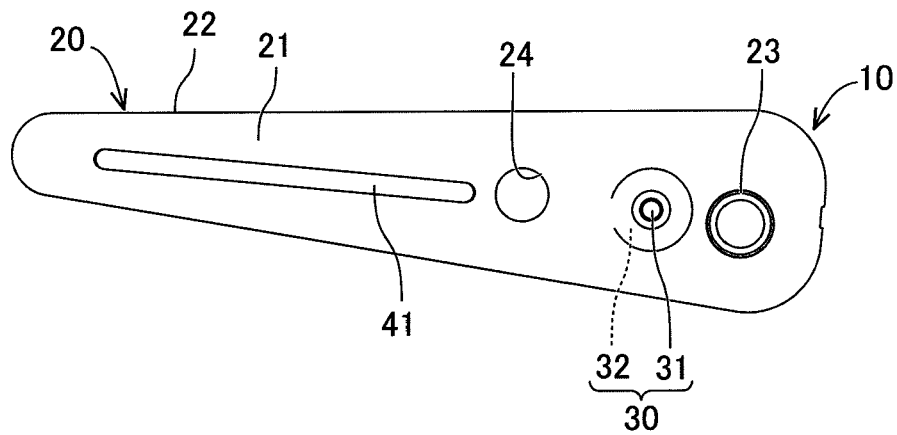
FIG. 4 is a bottom-view diagram of the core for armrest shown in FIG. 2.

The rib 40 is molded integrally with the same resinous material as that for the framed body 20 inside the framed body 20, in particular, onto an inner side face in the bottom 21 of the framed body 20. As illustrated in FIG. 3, a linear-shaped first rib 41 is formed onto one of the sides that is adjacent to the longitudinal middle but away from the rotation-supporting cylindrical section 23 in the bottom 21 of the framed body 20. A net-shaped second rib 42 is further formed onto the other one of the sides that is adjacent to the longitudinal middle and near the rotation-supporting cylindrical section 23 in the bottom 21 of the framed body 20. The second rib 42 is formed herein as a honeycomb shape as one of the examples of net shapes. Note that the second rib 42 is not limited at all to net shapes in which a plurality of raised portions intersect one another, but can also be provided with a configuration in which they do not intersect with the other raised portions.

As illustrated in FIG. 3 and FIG. 5, the second rib 42 is disposed so as to overlap with respect to the base-end face in the base-end large-sized section 32 of the stopper pin 30 in an axial direction of the stopper pin 30. Specifically, the second rib 42 overlaps with respect to a part of the outer-circumference edge of the base-end face in the base-end large-sized section 32 of the stopper pin 30. That is, in the base-end face of the base-end large-sized section 32, parts other than that part of the outer-circumference edge, emerge out of the bottom 21 of the framed body 20. More specifically, a widthwise part of the second rib 42 overlaps the base-end face in the base-end large-sized section 32. Moreover, the second rib 42 is formed so as not to be superimposed on the injection inlet 24.

Figure 6:
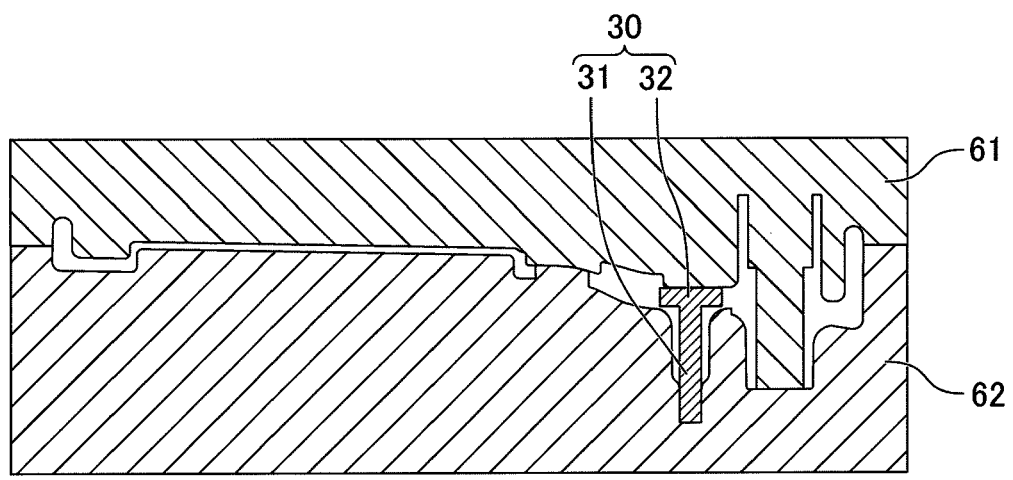
FIG. 6 is a cross-sectional diagram of molds for molding the core for armrest shown in FIG. 2, and of a stopper pin being put in a fixated state.

Next, explanations will be made on a manufacturing process for the above-described core 10 with reference to FIG. 6. As illustrated in FIG. 6, the stopper pin 30 is positioned inside molds (61, 62) for molding resin. On this occasion, a fraction corresponding to the above-described exposed fraction in the base-end large-sized section 32 of the stopper pin 30 contacts the first mold 61. On the other hand, the leading-end face in the leading-end shaft section 31 of the stopper pin 30 contacts the second mold 62 over the entire face. In addition, the leading-end side of the outer-circumference face in the leading-end shaft section 31 of the stopper pin 30 contacts the second mold 62.

Note herein that the exposed fraction of the base-end large-sized section 32 is formed in a range that corresponds to the leading-end face in the leading-end shaft section 31 in an axial direction. That is, at the time of insert molding, the opposite ends of the stopper pin 30 are pressed at the axis-wise identical positions by means of the molds (61, 62). Since it thus is possible to clamp the stopper pin 30 by means of the first mold 61 and second mold 62 in a state of being stably pressed in an axial direction, it is possible to position the stopper pin 30 highly accurately within the molds (61, 62). In this state, the framed body 20 and rib 40 are formed by injecting resin into a cavity inside the molds (61, 62), and simultaneously the stopper pin 30 is subjected to insert molding in the framed body 20. Therefore, since it is possible to position the stopper pin 30 highly accurately with respect to the resulting framed body 20 and rib 40, it is possible to cause the base-end face in the base-end large-sized section 32 of the stopper pin 30, and the second rib 42 so as to overlap one another securely in an axial direction.

In accordance with the present embodiment mode, it is possible to make the entire core 10 lightweight by means of making the framed body 20 and rib 40 of the core 10 of resin. Moreover, it is possible to secure strength for the stopper pin 30 itself by means of making the stopper pin 30, which is to be subjected to insert molding in the framed body 20, of metal. Therefore, in a state where the stopper pin 30 is hooked onto the stopper 52 of the supporting member 50 that is fixated onto a seat back, the stopper pin 30 itself exhibits high resistance to loads.

In addition, the second rib 42 is disposed so as to overlap with respect to the base-end face in the base-end large-sized section 32 of the stopper pin 30 in an axial direction. Consequently, it is possible to inhibit the stopper pin 30 from coming off from the framed body 20 by means of the high-strength second rib 42. Therefore, even when high loads act on the stopper pin 30, it can be retained integrally onto the framed body 20 and rib 40 that are made of resin.

Moreover, of the faces in the base-end large-sized section 32, a face on the leading-end side of the stopper pin 30 is designed so as to be covered with resin that forms the framed body 20. Thus, even when come-off forces, which are headed toward the leading-end side of the stopper pin 30, act with respect to the stopper pin 30, the stopper pin 30 can be retained integrally by means of resin forming the framed body 20 (i.e., resin covering the base-end large-sized section 32). That is, the stopper pin 30 can be prevented from coming off toward the leading-end side by means of resin covering the base-end large-sized section 32, and can be prevented from coming off toward the base-end side by means of the second rib 42. Therefore, the stopper pin 30 can be securely turned into a state where it is retained integrally onto the framed body 20.

Moreover, a widthwise part of the second rib 42 is disposed so as to overlap with respect to the outer-circumference edge of the base-end face in the base-end large-sized section 32 of the stopper pin 30 in an axial direction of the stopper pin 30. Thus, even a widthwise part of the second rib 42 can demonstrate forces that restrain the stopper pin 30 from coming off toward the base-end side.

Example 2

Figure 7:
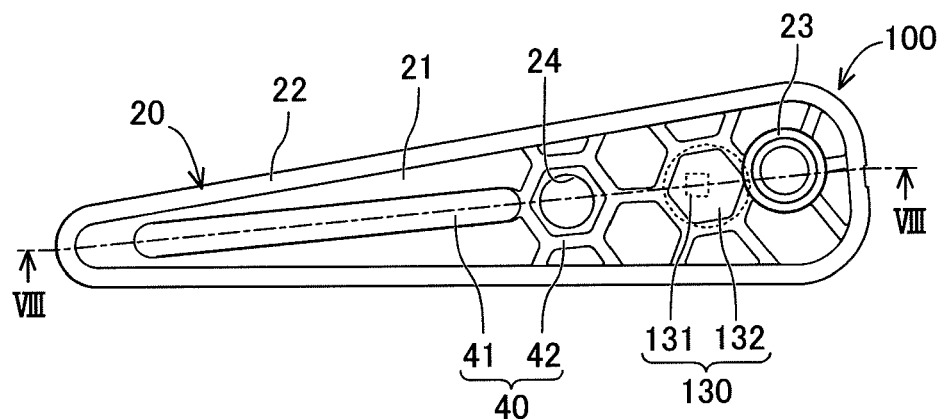
FIG. 7 is a plan-view diagram of a core for armrest in Second Embodiment Mode according to the present invention.
Figure 8:
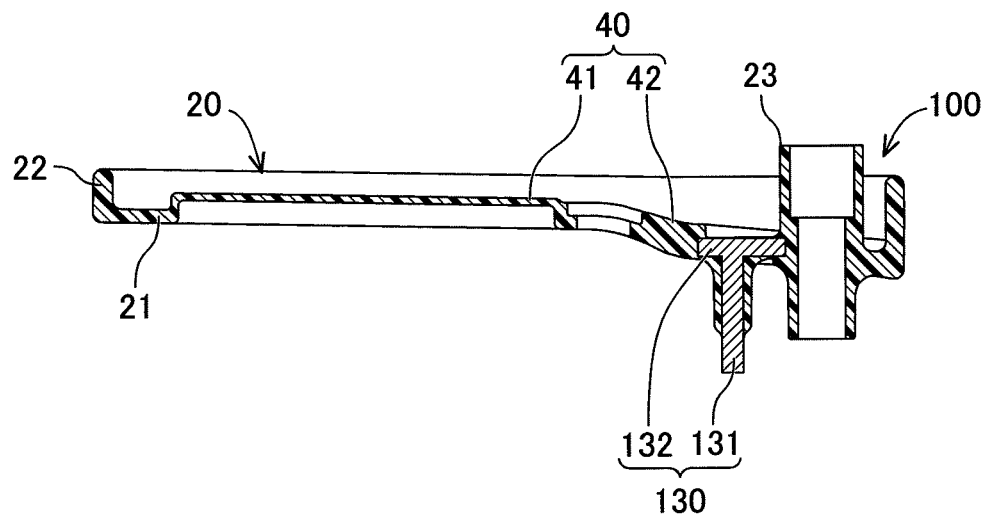
FIG. 8 is the "VIII"-"VIII" cross-sectional diagram of the core for armrest shown in FIG. 7.

Next, explanations will be made on a core 100 for armrest according to Second Embodiment Mode with reference to FIG. 7 and FIG. 8. In the core 100 according to the present embodiment mode, the same constituent elements as those of the aforementioned embodiment mode are labeled identical symbols with each other, thereby omitting the detailed explanations.

The core 100 according to the present embodiment mode is distinct from the aforementioned embodiment mode in that it comprises a different stopper pin 130. The stopper pin 130 includes a leading-end shaft section 131, and a base-end large-sized section 132. The leading-end shaft section 131 is formed as a rectangular column shape. The base-end large-sized section 132 is formed as a disk shape, and its center is made eccentric from the center of the leading-end shaft section 131. In addition, the base-end large-sized section 132 is buried in the framed body 20, but only the middle of the base-end face in the base-end large-sized section 132 is exposed. That is, the second rib 42 is disposed so as to axially overlap with respect to the entire periphery of the outer-circumference edge of the base-end face in the base-end large-sized section 132. Note herein that one of the reasons for making the leading-end shaft section 132 in a rectangular column shape is to carry out a phase determination for the base-end large-sized section 132.

Thus, since the second rib 42 is positioned over the entire periphery of the outer-circumference edge of the base-end face in the base-end large-sized section 132, it is possible to demonstrate very high restraining forces with respect to come-off forces that are headed toward the base-end side of the stopper pin 30.

Example 3

Figure 9:
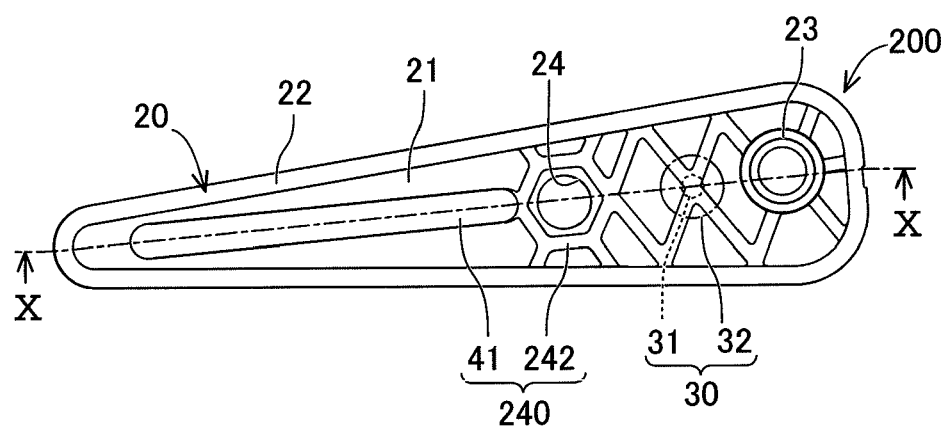
FIG. 9 is a plan-view diagram of a core for armrest in Third Embodiment Mode according to the present invention.
Figure 10:
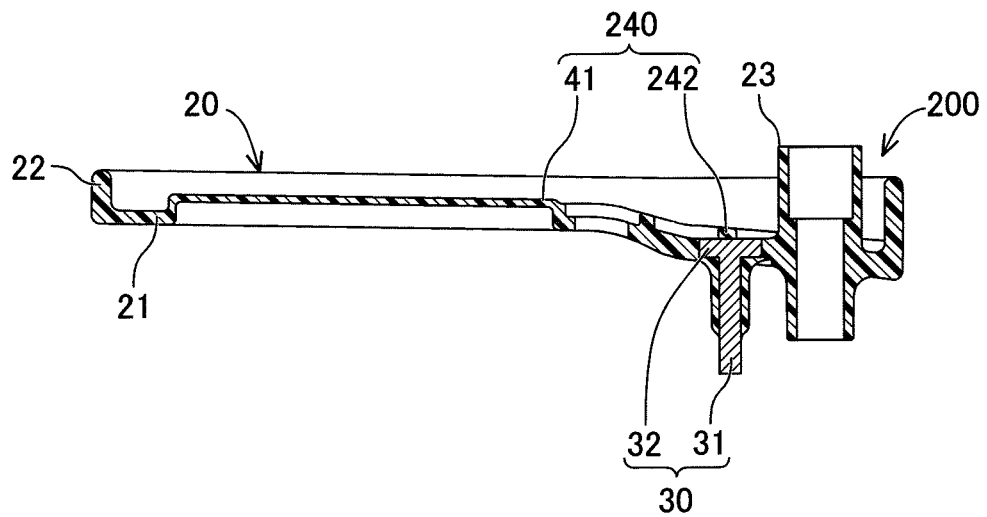
FIG. 10 is the "X"-"X" cross-sectional diagram of the core for armrest shown in FIG. 9.

Next, explanations will be made on a core 200 for armrest according to Third Embodiment Mode with reference to FIG. 9 and FIG. 10. In the core 200 according to the present embodiment mode, the same constituent elements as those of the aforementioned embodiment modes are labeled identical symbols with each other, thereby omitting the detailed explanations.

The core 200 according to the present embodiment mode is distinct from the aforementioned embodiment modes in that it comprises a different rib 240. The rib 240 includes the same first rib 41 as the aforementioned, and a second rib 242 being different from the other aforementioned. The second rib 242 is formed as a net shape inside the bottom 21. And, the second rib 242 is disposed so as to axially overlap with respect to the middle of the base-end face in the base-end large-sized section 32 of the stopper pin 30.

That is, the second rib 242 is disposed so as to overlap with respect to a range, of the base-end face in the base-end large-sized section 32 of the stopper pin 32, that corresponds to the leading-end face in the leading-end shaft section 31 in an axial direction. Thus, it is possible to securely demonstrate forces, which refrain the stopper pin 30 from coming off toward the base-end side of the stopper pin 30, by disposing the second rib 242 in a range that corresponds axially to the leading-end face in the stopper pin 30. However, it is not that the second rib 242 is formed so as to coat the base-end face in the base-end large-sized section 32 of the stopper pin 30 entirely; but some parts of the base-end face in the base-end large-sized section 32 are exposed. These exposed fractions are for positioning the stopper pin 30 at the time of insert molding in the same manner as aforementioned. Especially, even when the middle of the base-end face is not exposed at all, setting up an exposed fraction at a plurality of locations makes it possible to position the stopper pin 30 highly accurately within the molds (61, 62 (shown in FIG. 6)); as a result, it is possible to position the stopper pin 30 highly accurately with respect to the resulting framed body 20 and second rib 242.

What is claimed is:

1. A core for an armrest, the core being for an armrest that is supported rotatably onto a seat in a cantilevered manner, and the core comprising:
    a framed body being made of resin and having a bottom;
    a stopper pin being made of metal, the stopper pin being subjected to insert molding in said framed body so as to protrude a leading-end shaft thereof toward an outer side of said framed body, and being hooked onto a stopper of said seat, thereby being restricted from rotating; and
    a rib being integrally molded onto said framed body inside the framed body, said rib being raised from said bottom in an axial direction of said stopper pin; and
    wherein said stopper pin has a base-end large-sized section with a base-end side thereof and an opposite side face to said base-end side, the base-end large-sized section being formed as a cross-sectional configuration that is larger than that of the leading-end side, the leading end shaft extending from the base end side;
    said rib being disposed so as to overlap with respect to a base-end face of said base-end large-sized section of said stopper pin in an axial direction of said stopper pin, wherein the base end large-sized section is sandwiched between the bottom of the framed body and a portion of the rib.

2. The core for an armrest according to claim 1, wherein:
    the opposite side face to said base-end face of said base-end large-sized section is covered with resin forming said framed body.

3. The core for an armrest according to claim 1, wherein a part of the base-end face in said stopper pin, and at least a part of a leading-end face in said stopper pin are exposed in order to position said stopper pin at the time of insert molding.

4. The core for an armrest according to claim 3, wherein an exposed fraction of the base-end face in said stopper pin corresponds to the leading-end face of said stopper pin in an axial direction.

5. The core for an armrest according to claim 1, wherein a width of said rib is disposed so as to overlap with respect to an outer-circumference edge of the base-end face in said stopper pin in an axial direction of said stopper pin.

6. The core for an armrest according to claim 3, wherein said rib is disposed so as to overlap the base-end face in said stopper pin, corresponding to the leading-end face in an axial direction.

* * * * *